United States Patent [19]
Bellus et al.

[11] Patent Number: 5,828,451
[45] Date of Patent: Oct. 27, 1998

[54] SPECTRAL IMAGING SYSTEM AND METHOD EMPLOYING AN ACOUSTO-OPTIC TUNABLE FILTER FOR WAVELENGTH SELECTION WITH INCREASED FIELD OF VIEW BRIGHTNESS

[75] Inventors: Peter A. Bellus, Eden Prairie, Minn.; Dennis R. Suhre, Monroeville, Pa.

[73] Assignee: Northrop Grumman Corporation, Los Angeles, Calif.

[21] Appl. No.: 940,543

[22] Filed: Sep. 30, 1997

[51] Int. Cl.[6] ....................................................... G01J 3/28
[52] U.S. Cl. ............................ 356/326; 356/308; 356/328
[58] Field of Search .................................. 356/308, 326, 356/328

[56] References Cited

U.S. PATENT DOCUMENTS

| 4,783,166 | 11/1988 | Stern | 356/36 |
| 5,216,484 | 6/1993 | Chao et al. | 356/326 |
| 5,606,413 | 2/1997 | Bellus et al. | 356/326 |

OTHER PUBLICATIONS

"White–Light Imaging By Use of a Multiple Passband Acousto–Optic Tunable Filter", *Applied Optics*, D.R. Suhre et al, vol. 35, No. 22, Aug. 1, 1996, pp. 4494–4501.

*Primary Examiner*—F. L. Evans
*Attorney, Agent, or Firm*—Walter G. Sutcliff

[57] ABSTRACT

An acousto-optic tunable filter (AOTF) has one or more optical wavelength passbands dependent on the frequency or frequencies of a radio frequency signal applied thereto. A radio frequency generator applies the radio frequency signal under computer control of the RF frequency so that the radio frequency signal has one or more preselected frequency components. An input optics system directs incident object or scene light to the AOTF. A first polarizing element passes to the AOTF only image light which is polarized in a first direction. A second polarizing element receives output image light from the AOTF and passes only image light which is polarized in a direction orthogonal to the first direction. The image light passed by the second polarizing element is detected by a camera. An output optics system focusses image light passed by the second polarizer on an image plane of the camera, and an image corresponding to the detected image light is recorded. An image processor receives recorded image data for processing.

13 Claims, 2 Drawing Sheets

SPECTRAL IMAGING SYSTEM AND METHOD EMPLOYING AN ACOUSTO-OPTIC TUNABLE FILTER FOR WAVELENGTH SELECTION WITH INCREASED FIELD OF VIEW BRIGHTNESS

BACKGROUND OF THE INVENTION

The present invention relates to real-time, spectral imaging systems having acousto-optic tunable filters for control of wavelength content of generated images.

Spectral imaging systems, which produce wavelength-specific images are used to generate a map image based upon the response of elements in the scene to different wavelengths of light. These systems and the maps they produce have a number of important applications. Significant areas of application include environmental monitoring (such as oil spill tracking), agricultural monitoring (such as crop development or plant stress), geologic surveying, remote object detecting, and various kinds of medical diagnostics and industrial product testing.

In the past, spectral imaging systems have used a fixed set of filters to collect spectral images from space, as in the LANDSAT and EOSTAT systems. This type of system restricts generated images to the wavelengths passed by the fixed set of filters, and thus fails to provide wavelength selection in image generation.

Subsequently, spectral imaging systems have employed rasterscanning of single-point detectors to generate spectral images with selected wavelength content. However, in these systems, image development requires complex computational processing which must be performed off-line. In the raster scanning type of image systems, dispersive gratings or prisms or interferometers have been used for wavelength selection.

More recently, acoustic-optic tunable filters have been employed in spectral imaging systems to enable real-time, spectral imaging with wavelength selection. For example, U.S. Pat. No. 5,216,484, entitled REAL-TIME IMAGING SPECTROMETER and filed by Chao, et al. on Dec. 9, 1991 discloses a spectral imaging system in which an acousto-optic tunable filter (AOTF) is used as a wavelength selection device. In this spectral imaging system, the AOTF is progressively tuned to scan a range of wavelengths thereby producing a large number of successive image frames for analysis. As a result, this spectral imaging system collects imagery in real time (i.e. each image collected at a specific wavelength is available for viewing immediately as it is collected in real time) but has no capability for real-time processing of collected spectral image data. Thus, the information about the scene that can be extracted from the spectral information recorded on a succession of images each at a different spectral bandpass cannot be extracted contemporaneously with the image data collection, and thus is not available in "real-time".

The spectral imaging system disclosed in U.S. Pat. No. 5,606,413, entitled REAL TIME SPECTROSCOPIC IMAGING, SYSTEM AND METHOD, and issued to P. A. Bellus and T. L. McKinney on Feb. 25, 1997, employs an AOTF or other tunable optical filter tuned to multiple wavelengths in at least two successive frames to produce real-time output processed spectral image data representative of a physical characteristic of an object or terrain being imaged.

In the prior art AOTF spectral imaging systems, the small diffraction angle of the first order beam, relative to the zero order beam, requires use of a narrow field of view (FOV) which significantly limits the scope and brightness of processed spectral images. For example, in the referenced U.S. Pat. No. 5,216,484, Chao, et al., in column 7, lines 39–54, state that the FOV of their AOTF imaging spectrometer is mainly restricted to the azimuthal angular aperture of the AOTF. If a wide FOV is used, the zero order non-deflected image overlaps the deflected filtered image. The zero order image contains all wavelengths except those contained in the filtered image, and thus is much brighter than the filtered image. The brighter "noise" overwhelms the first order filtered image in the wide FOV device, thereby leading to the need for prior art AOTFs to have a narrow FOV with its attendant limitations.

The light-gathering power of an optical system can be described by the FOV in terms of the acceptance angle for light entering the system, or by the F number, which is the ratio of the focal length to the AOTF entrance pupil diameter. A lower F number indicates an optical system having a higher relative speed (i.e. greater light gathering ability). In prior art AOTF spectral imaging systems, a large F number results from the necessarily narrow FOV, and the size of AOTF devices, which are generally kept small due to the high cost of procuring large optical quality crystals of acousto-optic material such as tellurium dioxide.

Accordingly, prior art AOTF spectral imaging systems have high F numbers. Nonetheless, important low-light applications require a low F number system. For example, airborne remote sensing requires an imaging capability in poor weather to compete with remote satellite sensing.

Improvements are thus needed in AOTF spectral imaging systems to enable use of lower F numbers and wider FOVs and to achieve brighter imaging with real-time operation.

SUMMARY OF THE INVENTION

In accordance with the invention, a spectral imaging system comprises an acousto-optic tunable filter (AOTF) having one or more optical wavelength passbands dependent on the frequency or frequencies of a radio frequency signal applied thereto. A radio frequency generator applies the radio frequency signal with one or more preselected frequency components.

An input optics system directs incident object or scene light to the AOTF. A first polarizing element is disposed between the input optics system and the AOTF to pass to the AOTF only image light which is polarized in a first direction. A second polarizing element is disposed to receive output image light from the AOTF and to pass only image light which is polarized in a direction orthogonal to the first direction.

Means are provided for detecting image light passed by the second polarizing element, and an output optics system focusses image light passed by the second polarize on an image plane of the detecting means. An image grabber records an image corresponding to the detected image light, and an image processor receives recorded image data for processing.

BRIEF DESCRIPTION OF THE DRAWINGS

The accompanying drawings, which are incorporated in and constitute a part of this specification, illustrate a preferred embodiment of the invention and together with the description provide an explanation of the objects, advantages and principles of the invention. In the drawings.

DISCLOSURE OF THE INVENTION

In accordance with the current invention, a real-time, spectral imaging system is structured with an AOTF to collect and analyze spectral image data in real time and produce better, brighter spectral images with a significantly wider FOV and lower F number. The invention enables spectral imaging systems to be applied effectively in a wide variety of applications including low-light applications.

As indicated in an article entitled WHITE-LIGHT IMAGING BY USE OF A MULTIPLE PASSBAND ACOUSTO-OPTIC TUNABLE FILTER, authored by D. R. Suhre and J. G. Theodore, and published in APPLIED OPTICS on Aug. 1, 1996, and in references cited therein, AOTF technology has matured to the point where the operation and performance characteristics of AOTFs are well known. Thus, AOTFs can, in general, be incorporated in optical systems to provide tunable filtering of visible and infrared light.

Narrow FOV and large F numbers have significantly limited the utility of AOTFs as tunable filters in spectral imaging systems as described in the Background Section above. The invention enables AOTF spectral imaging systems to operate with a substantially wider FOV and a low F number and thereby produce better, brighter spectral images.

Figure 1:
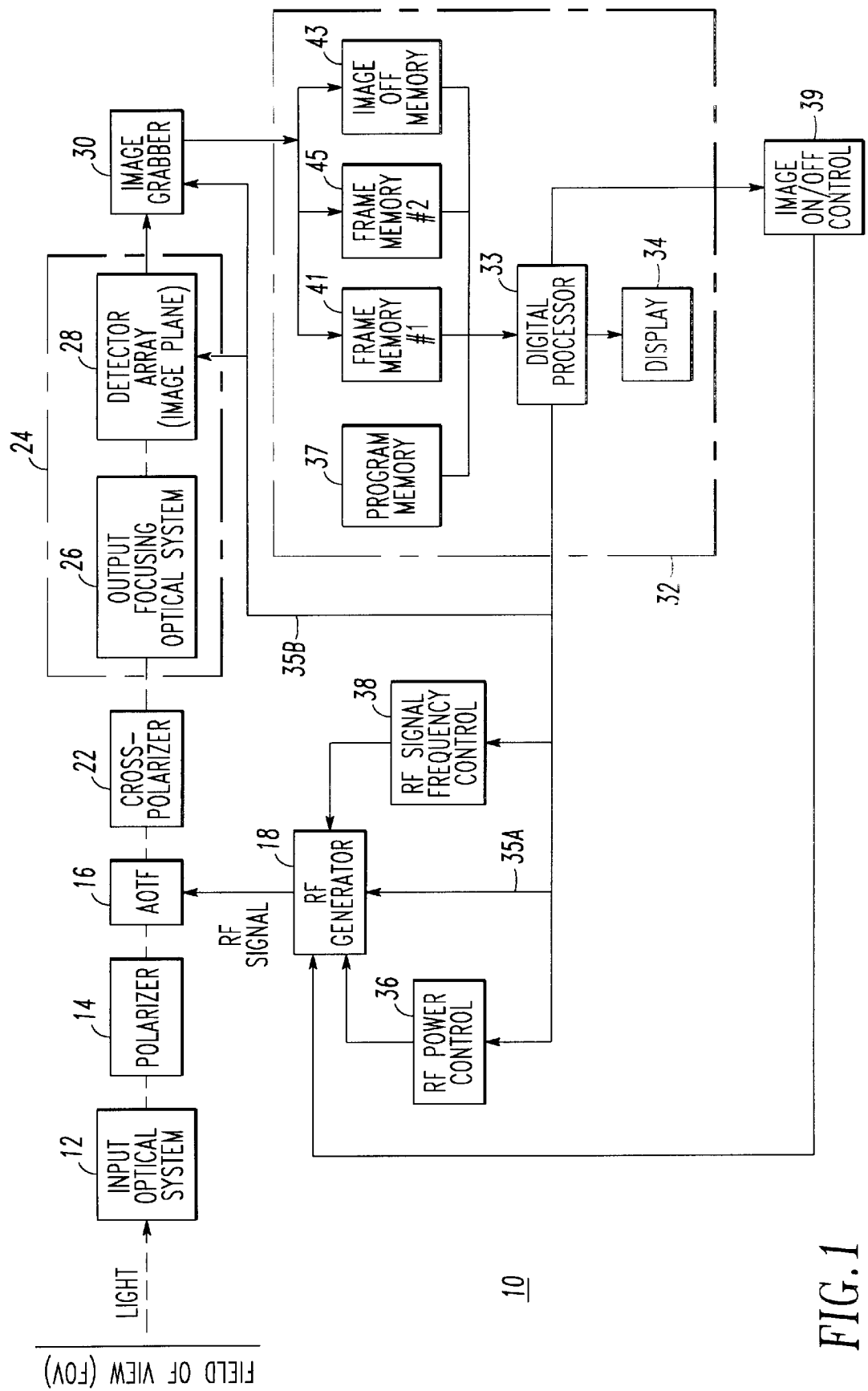
FIG. 1 shows a block diagram of a spectral imaging system structured in accordance with the invention.

An AOTF spectral imaging system 10 is arranged in accordance with the invention as shown in FIG. 1. An input optical system 12 operates with an FOV as great as 15 degrees or more, and directs scene light through a polarizer 14 to an input face of an AOTF 16.

Figure 2:
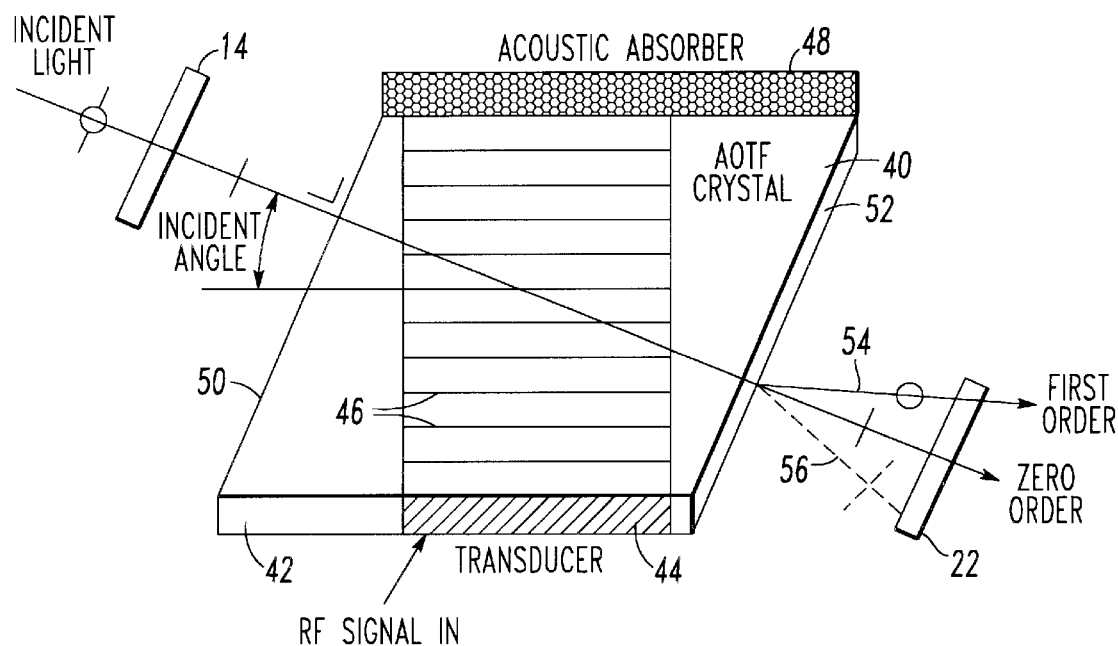
FIG. 2 is a schematic diagram of an AOTF arranged in accordance with the invention and employed in the system of FIG. 1.

Basically, the AOTF 16 generates acoustic waves which travel across a crystal in response to an RF signal applied to a transducer face of the crystal from an RF generator 18. The frequency content of the RF signal determines the frequency content of the acoustic waves which, in turn, determines the diffraction of different wavelengths of the incoming light in a light output, thereby functioning as a tunable optical filter. As shown in greater detail in FIG. 2, the AOTF 16 includes a crystal element 40, formed from a material such as tellurium dioxide. The crystal 40 is normally formed with a solid parallelogram shape as shown.

The crystal has an end face 42 where a transducer 44, made of a material such as lithium niobate, is provided to convert an applied RF signal to planar acoustic waves indicated by the reference character 46. The transducer 44 converts frequency components of the RF signal to corresponding acoustic frequency components according to a known characteristic.

The acoustic waves travel across the crystal 40 to an opposite end face where they are absorbed by an acoustic absorber 48.

A crystal optical side face 52 passes incoming light from the polarizer 14 to the crystal body. The input light interacts with the acoustic waves 46, with wavelength components of the light diffracted in accordance with the frequency components of the acoustic waves 46, and, therefore, in accordance with the frequency components of the applied RF signal.

Output light, including diffracted components, passes through a crystal output optical side face which is opposed to the input optical side face 52.

With reference again to FIG. 1, output light passes from the AOTF 16 through a cross-polarizer 22 to a camera (or image recorder) 24. The polarizer 14 may, for example, provide vertical polarization, and, in such case, the cross-polarizer 22 would be a horizontal polarizer.

The camera 24 may be a CCD camera or other solid state array camera whose elements are sensitive to light at wavelengths passed by the chosen AOTF. A tube camera (vidicon, etc.) could also be used. Preferably the camera has a fast framing rate of 60 Hz or more as the switching speed of the AOTF can keep up with such framing rates and the use of such fast cameras increases data throughput, improving the viewability of the processed image data. As shown, the camera 24 includes an optical system 26 for focusing output light from the AOTF 16 to an image plane in a detector array 28, such as a CCD array, a vidicon tube or other imaging device.

An image grabber 30 receives successive image frames and transmits them to a digital computer system 32 for image processing on a frame-by-frame basis, a paired frame basis, or other multiple frame basis, consistent with real time image processing and analysis by the system 10. The computer system 32 has a processor 33 which operates under the control of a program 37 stored in memory to process images and to operate external apparatus in synchronization and as otherwise described herein.

After image processing, an output frame image or, in the case of paired or multiple frame operation, an output composite image is generated on a display 34 to provide an analyzed image output.

Single frame images can be produced from a minimum of two successive frames. Such single frame images, as opposed to full-motion video, are used where a single frame itself provides a desired analysis of a scene. Successive display images represent a spectrally analyzed scene in real time.

Paired or multiple frames are processed to composite images where different wavelengths of light are passed for such frames as a comparison basis for revealing an image indicative of a physical characteristic to which the wavelengths are related. In the latter case, successive composite images represent a spectrally analyzed scene in real time.

The computer system 32 also generates control signals which are applied directly to the RF generator 18 and the detector array 28 and the image grabber 30 to synchronize the system operation as indicated by the reference characters 35A and 35B. Computer control signals are also applied to an RF power control 36 and an RF frequency control 38.

The frequency control 38 controls the RF generator 18 to determine the frequency content of the RF signal output applied to the AOTF 16 and thereby determine the wavelength(s) of light passed by the AOTF 16. The power control 36 controls the RF generator 18 to control the power level of each frequency component of the generated RF signal.

As one example, the RF signal may contain a single frequency component which will cause the AOTF 16 to pass blue light which is indicative of a particular physical characteristic of a scene. As another example, the RF signal may contain multiple frequency components, with the respective components generated at different power levels thereby producing weighted AOTF bandpasses and providing an additional dimension of control over the operation of the AOTF 16.

As another example, different pass wavelengths may be used in successive frames to provide a contrast indication for a physical characteristic in a displayed composite image. The physical characteristic may, for example, be moisture content of objects in the scene. The previously referenced Bellus/McKinney U.S. Pat. No. 5,606,413 provides more information on paired or multiple frame operation.

In application, a user selects the RF frequency component(s) according to a known relationship between such wavelength(s) and a physical characteristic of the scene being recorded. For example, red light may be indicative of a physical characteristic of interest, and the RF signal would thus be set to tune the AOTF 16 to pass red light. As a specific example, the AOTF 16 may be tuned to 800 nanometers which will pass light that indicates the chlorophyl content of plants in photographed scene.

As previously indicated, an AOTF can be tuned electronically to pass different wavelengths by changing the frequency of RF energy applied to the device. Further, the AOTF can be operated in both random access mode, where a single RF frequency is applied to the AOTF cell and a single wavelength of light is passed through the filter, or in a multiaccess mode, where several RF frequencies are applied simultaneously, and several wavelengths of light are passed simultaneously through the filter. The peak transmission of the AOTF (i.e., the ratio of passed light to incident light) is proportional to the square root of the acoustic power density (I. C. Chang, Optical Engineering, 20, 824 (1981)). Since the acoustic power density is proportional to the applied RF power, the transmission of the filter at the optical passband varies in accordance with RF power applied.

Normally, consideration is given to applied RF power only in the context of energy efficiency of available amplifier power, since, in most AOTF applications, a need exists for maximum selected wavelength transmission. Thus, the minimum RF power is determined to be that which is required to achieve essentially 100% transmittance at the passband in the system design to be sure that enough amplifier power is provided without wasting energy. However, in applying RF power below that required to achieve maximum transmittance in an AOTF, a transmission of less than 100% occurs and such transmittance is predictable on the basis of RF power inputs to the AOTF.

In accordance with the invention, the AOTF operates as a combination wavelength selection filter and a programmable neutral density filter. The frequency of the RF energy is selected electronically (for example, through a VCO or a frequency synthesizer in the frequency control 38), and the RF power of the signal applied is selected electronically (for example, through an amplifier and a programmable attenuator in the RF power control 36). Both the passband and the transmittance at the passband are thus both selectable, preferably under computer program control. The light passed by the AOTF filter under such program control reaches equally and simultaneously all pixels of the recording camera.

For example the AOTF system can be programmed to pass a series of adjacent, overlapping wavelengths over a frequency band, with the transmittance at each wavelength programmed to match the wavelength response of a narrowband detector whose characteristics are different from the broadband detector behind the AOTF. This permits a single broadband detector to be used to simulate the response of a variety of different narrowband detectors. As another example, the spectral response of the AOTF can be set to mimic the effect of an alternative narrowband illuminant. Thus, a blue light rolloff can be applied to the AOTF to simulate illumination under tungsten light while the scene is actually illuminated by sunlight.

In remote sensing, data from a particular sensor is collected at each of the sensor wavelengths. The data is correlated to some physical property of the terrain under observation. The mathematical model used may be simple (i.e., the ratio of the reflectivity measured in one band to that of another), or may be a complex ratio of sums and differences of terms, each term being the reflectivity measured in a given band. Often the term associated with the measured reflectivity in a band is weighted with a weighting factor. An example of a function produced from a weighted sum of terms is the "Brightness Index" attributed to Crist in C. Banninger, Symp. Remote Sens. for Resources Dev. and Envir. Mgmt., Enschede, Neth., Aug. 1986, p. 371. The function is a weighted sum of reflectivities in various Landsat Thematic Mapper bands and is given as:

$$0.3037(TM1)+0.2793(TM2)+0.4743(TM3)+0.5585(TM4)+0.5082(TM5)+0.1863(TM7)$$

Normally, this is calculated by taking six TM frames, applying the weighting factors pixel by pixel digitally and summing the result. This invention provides improved performance by using the appropriate amount of RF power for each selected RF frequency component and simultaneously applying the components to an AOTF such that the transmission of the AOTF in each band is scaled proportionately to the coefficient in the above equation. The resulting image is the "Brightness Index" directly.

Many image wavelength relationships employ negative coefficients or ratios or more complex mathematical relationships. Calculation of these requires digital processing of images. The method described here could still be implemented, however, and while not eliminating digital processing of the imagery, could reduce the number of frames to be processed, thereby increasing throughput. An example of a function produced from weighted sums and differences of terms is the "Greenness Index" attributed to Crist in C. Banninger, Symp. Remote Sens. for Resources Dev. and Envir. Mgmt., Enschede, Neth., Aug. 1986, p. 371. The function is comprised of weighted sums and differences of reflectivities in various Landsat Thematic Mapper bands and is given as:

$$-0.2848(TM1)-0.2435(TM2)-0.5436(TM3)+0.7343(TM4)+0.0840(TM5)-0.1800(TM7)$$

Normally, this is calculated by taking six TM frames, applying the weighting factors pixel by pixel digitally and summing the result. The invention performs a mathematically equivalent method by breaking the equation into two parts, A and B:

$$A=0.7343(TM4)+0.0840(TM5)$$

$$B=0.2848(TM1)+0.2435(TM2)+0.5436(TM3)+0.1800(TM7)$$

Two successive frames are taken, one corresponding to A, the other to B. In each frame, the appropriate amount of RF power is applied at each appropriate RF frequency component and simultaneously applying the components to an AOTF such that the transmission of the AOTF in each band is scaled proportionately to the corresponding coefficient in the equations for A and B. With operation only on the pixels that overlap between the frames, the values of the frame overlap pixels of image B are subtracted from the values of the pixels of image A. The resulting image is the "Greenness Index", calculated from only two frames instead of six frames.

Aside from increased data throughput, simpler image registration is achieved using this method. In the prior art such as Cutts U.S. Pat. No. 5,379,065, the ability of the AOTF to switch wavelength quickly is used with a variable exposure time for each wavelength imaged through the AOTF to compensate efficiently for reflectivity differences between bands. By programming the AOTF to give variable transmittance in accordance with the invention, a constant exposure time can be used, allowing a constant ground track and simplifying registration between successive images.

In system operation, randomly polarized light from the scene first passes through the polarizer 14, thereby passing only one polarization the AOTF 16. At a preselected bandpass frequency, only a small range of wavelengths is diffracted with its polarization rotated as a positive first order beam as indicated by the reference character 54. The negative first order beam does not exit since polarizer 14 rejects the polarization needed to produce that component.

The single polarization passed by the polarizer 14 can theoretically be blocked by the crossed polarizer 22 set orthogonally to the polarizer 14, leaving only the signal produced by the AOTF diffracting part of the intensity into the orthogonal polarization. However, the crystal 16 is, in practice, birefringent and thus rotates the polarization component selected by polarizer 14 to some extent. The output from the polarizer 22 thus contains some zero-order image with the passed first-order image. At the output of the polarizer 22, the passed zero-order image appears as a white "ghost" image separated by about 3 degrees from the passed first-order image.

The system 10 is thus operated to remove the undesired or "ghost" zero-order image from each frame. The desired first-order image is representative of the physical characteristic of interest in the scene, and it is further processed by the computer 32 for output to the display 34.

The digital processor 33 operates an ON/OFF control 39 to turn the RF generator 18 ON and OFF in each frame so that FILTER ON and FILTER OFF images are successively presented to the image grabber 30. In turn, the computer 32 transfers the ON image to frame memory 41 and the successive OFF image to an image OFF memory 43. The processor 33 then subtracts the OFF image from the ON image and overwrites the result in the memory 41, thereby providing a firstorder image with the zero-order removed by subtraction. Experiments have shown that the zero-order image is normally about two orders of magnitude in intensity below the first-order image, and thus is subtracted as described without harm to the signal-to-noise ratio in most instances.

If single frame operation is being used, the processed image is transferred from the memory 41 to the display 34 where the image is observed to contain only the filter pass wavelength (or multiple wavelengths, if multiple pass wavelengths are set for the AOTF filter 16) with real-time operation for spectral image collection and processing. In multiple frame operation, the described image processing for "ghost" image removal is performed for each frame, a composite of the frame images is then obtained for generation to the display 34, with spectral image collection and analysis still being provided in real time.

In this case, the system 10 provides multiple frame operation with the use of paired frames. Thus, after a first frame is processed as previously described and the processed image is stored in the memory 41, the image contained in a successive second frame is processed for "ghost" removal as previously described, and the resultant image is stored in a second frame memory 45. Thereafter, the "ghost-free" images in the memories 41 and 43 are processed to form a composite image for the display 34, with real-time spectral image collection and analysis.

As a result of the described system structure and operation, the FOV can be increased from about 3 degrees to 20 degrees or more. Since the amount of optical power is proportional to the square of FOV, the resultant spectral images produce by a system of the invention are brighter than conventionally generated spectral images by 25 times or more.

The foregoing description of the preferred embodiment has been presented to illustrate the invention without intent to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. A spectral imaging system comprising: an acousto-optic tunable filter (AOTF) having one or more optical wavelength passbands dependent on the frequency or frequencies of a radio frequency signal applied thereto;

a radio frequency generator for generating the radio frequency signal;

means for controlling the radio frequency generator so that the radio frequency signal has one or more preselected frequency components;

an input optics system for directing incident object or scene light to the AOTF;

a first polarizing element disposed between the input optics system and the AOTF to pass to the AOTF only image light which is polarized in a first direction;

a second polarizing element disposed to receive output image light from the AOTF and to pass only image light which is polarized in a direction orthogonal to the first direction:

means for detecting image light passed by the second polarizing element;

an output optics system for focussing image light passed by the second polarizer on an image plane of the detecting means;

an image grabber for recording an image corresponding to the detected image light; and an image processor for receiving recorded image data for processing.

2. The system of claim 1 wherein the detected image light contains first order diffracted image light and a significantly restricted amount of zero order image light.

3. The system of claim 2 wherein means are provided for removing image data from the processed image data in correspondence to the restricted amount of zero order light from the detected image light.

4. The system of claim 1 wherein an image display is provided and the image processor processes recorded image data to show the image on the display.

5. The system of claim 3 wherein:

a computer system includes the image processor and further controls the radio frequency generator to control the radio frequency component(s) generated thereby and to tune the radio frequency generator successively on and off:

the image grabber successively records on/off images successively received by the detecting means during on and off states of the radio frequency generator; and the image processor compares image data for the successive on/off images to remove the zero order light from the detected image light.

6. The system of claim 5 wherein the image processor subtracts the off image data from the on image data to produce a detected image substantially free of zero order light.

7. The system claim 1 wherein:

the detecting means is a camera operating to produce successive detected images in successive time frames;

a computer system includes the image processor;

the computer system controls the radio frequency generator to generate, in a first time frame, a radio frequency signal having at least a first predetermined frequency component which corresponds to a first optical wavelength having a first relationship to a physical characteristic of an object or scene from which the incident light is received;

the computer system controls the radio frequency generator to generate, in at least a second time frame successive to the first time frame, a radio frequency signal having at least a second predetermined frequency component which corresponds to a second optical wavelength having a second relationship to the physical characteristic of the object or scene, with the first and second predetermined relationships being related;

an image display is operated by the computer system;

the image grabber successively recording successive first and second frame images in the first and second time frames; and the image processor comparing image data of the first and second frame images to display a composite image indicative of the physical characteristic.

8. The system of claim 1 wherein the controlling means further controls the radio frequency generator to control a power level of each generated radio frequency component thereby enabling the AOTF to be tuned to each optical passband corresponding to each generated radio frequency component and to provide optical transmittance in each passband in correspondence to the power of the corresponding radio frequency component.

9. The system of claim 8 wherein a computer system includes the image processor and the computer system controls the radio frequency generator as defined.

10. A spectral imaging system comprising:

an acousto-optic tunable filter (AOTF) having one or more optical wavelength passbands dependent on the frequency or frequencies of a radio frequency signal applied thereto;

a radio frequency generator for generating the radio frequency signal;

means for controlling the radio frequency generator so that the radio frequency signal has one or more preselected frequency components;

an input optics system for directing incident object or scene light to the AOTF;

means for detecting image light passed by the AOTF;

an output optical system for focussing image light passed by the AOTF on an image plane of the detecting means;

an image grabber for recording an image corresponding to the detected image light;

an image processor for processing recorded images; and the controlling means further controlling the radio frequency generator to control a power level of each generated radio frequency component thereby enabling the AOTF to be tuned to each optical passband corresponding to each generated radio frequency component and to provide optical transmittance in each passband in correspondence to the power level of the corresponding radio frequency component.

11. A method for operating a spectral imaging system, the steps of the method comprising:

generating a radio frequency signal having one or more frequency components;

applying the radio frequency signal to an acousto-optic tunable filter (AOTF) to create one or more passbands having optical wavelength(s) in correspondence to the radio frequency component(s);

focussing incident image light from an object or scene on an input face of the AOTF;

polarizing the incident image light in a first polarization direction;

polarizing output image light from the AOTF in a second polarization direction orthogonal to the first polarization direction;

focussing the polarized output image light on an image plane of an image detector;

recording the image detected by the image detector; and processing data of the recorded image.

12. The method of claim 11 wherein the detected image light contains first order diffracted image light and a significantly restricted amount of zero order image light and the method steps further comprise:

processing recorded image data substantially to remove image data corresponding to the zero order image; and using the processed image data to display an image substantially free of zero order light.

13. The method of claim 12 wherein the method steps further include:

turning the radio frequency generator on and off in successive time slots to create successive recorded images; and combining the image data for the successive images to generate an image of the object or scene substantially free of zero order light.

* * * * *